(12) United States Patent
Kamdar et al.

(10) Patent No.: US 8,886,780 B2
(45) Date of Patent: Nov. 11, 2014

(54) OPTIMIZING SERVICES IN EXTREME ENVIRONMENTS FOR BUNDLED SERVICES IN A FIXED BROADBAND WIRELESS INSTALLATION

(75) Inventors: Kamlesh S. Kamdar, Dublin, CA (US); Raafat Edward Kamel, Little Falls, NJ (US); Sergio Aguirre, Southlake, TX (US); Lalit Ratilal Kotecha, San Ramon, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 685 days.

(21) Appl. No.: 12/851,164

(22) Filed: Aug. 5, 2010

(65) Prior Publication Data

US 2012/0034912 A1 Feb. 9, 2012

(51) Int. Cl.
*G06F 15/173* (2006.01)
*H04W 24/00* (2009.01)
*H04L 1/00* (2006.01)
*H04L 12/813* (2013.01)
*H04W 4/00* (2009.01)
*H04N 7/20* (2006.01)
*H04W 4/22* (2009.01)
*H04W 84/18* (2009.01)
*H04L 12/801* (2013.01)
*H04L 12/851* (2013.01)

(52) U.S. Cl.
CPC ............... *H04N 7/20* (2013.01); *H04W 84/18* (2013.01); *H04L 47/20* (2013.01); *H04L 47/14* (2013.01); *H04W 4/006* (2013.01); *H04W 4/22* (2013.01); *H04L 47/2408* (2013.01)
USPC ........................... 709/223; 455/425; 370/235

(58) Field of Classification Search
USPC ............... 709/220–232; 455/423–425, 426.2, 455/427; 370/232, 235
See application file for complete search history.

(56) References Cited

U.S. PATENT DOCUMENTS

| | | | |
|---|---|---|---|
| 7,206,567 B2 * | 4/2007 | Jin et al. ..................... | 455/404.1 |
| 8,391,147 B2 * | 3/2013 | Yeom .......................... | 370/235 |
| 2004/0030797 A1 * | 2/2004 | Akinlar et al. ............... | 709/232 |
| 2005/0179607 A1 | 8/2005 | Gorsuch et al. | |
| 2007/0173303 A1 | 7/2007 | Viorel et al. | |
| 2008/0233958 A1 * | 9/2008 | Robbins et al. ............. | 455/436 |
| 2009/0196194 A1 * | 8/2009 | Paloheimo et al. .......... | 370/252 |
| 2010/0009690 A1 * | 1/2010 | Jin et al. ....................... | 455/450 |
| 2010/0150122 A1 * | 6/2010 | Berger et al. ................. | 370/338 |
| 2010/0177080 A1 * | 7/2010 | Essinger et al. ............. | 345/211 |
| 2010/0311321 A1 | 12/2010 | Norin | |
| 2010/0313232 A1 | 12/2010 | Norin | |
| 2011/0207429 A1 * | 8/2011 | Maier et al. ................. | 455/404.2 |

\* cited by examiner

*Primary Examiner* — Yasin Barqadle

(57) ABSTRACT

A device monitors temperature readings from a sensor associated with an outdoor broadband unit. When the temperature readings increase above a stored threshold value, the device sends, to a device at a core network, an alert signal that invokes, at the core network, an emergency profile associated with the outdoor broadband unit. When the temperature readings decrease below the stored threshold value, the device sends, to the device at the core network, a normal signal that invokes, at the core network, a default profile associated with the outdoor broadband unit.

19 Claims, 7 Drawing Sheets

OPTIMIZING SERVICES IN EXTREME ENVIRONMENTS FOR BUNDLED SERVICES IN A FIXED BROADBAND WIRELESS INSTALLATION

BACKGROUND

Bundled media services (e.g., combination packages of television, telephone, and broadband Internet services) may be offered to households in areas without wired connections by using fixed wireless services for some of these services (e.g., VoIP and/or broadband access). As wireless network data rates improve using fourth generation (4G) technologies, such as Long-Term Evolution (LTE), network data rates have become more attractive for fixed wireless networks. Outdoor customer premises equipment (CPE) used to facilitate broadband wireless signals generally functions normally in typical environmental conditions. However, extreme environments, such as excessive heat and/or sun exposure, may degrade outdoor CPE performance and prevent vital communications.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide customer premises equipment (CPE) for a fixed broadband wireless architecture that may adapt to support emergency telephony service in extreme conditions. In one example implementation, the systems and/or methods may monitor temperature readings from a sensor associated with an outdoor broadband unit. When the temperature readings increase above a stored threshold value, the systems and/or methods may send, to a device at a core network, an alert signal that invokes, at the core network, an emergency profile associated with the outdoor broadband unit. When the temperature readings decrease below the stored threshold value, the systems and/or methods may send, to the device at the core network, a normal signal that invokes, at the core network, a default profile associated with the outdoor broadband unit. In another example implementation, the systems and/or methods may restrict non-critical local functions for the outdoor broadband unit when the temperature readings increase above the stored threshold value, and restore the non-critical local functions for the outdoor broadband unit when the temperature readings decrease below the stored threshold value.

Figure 1:
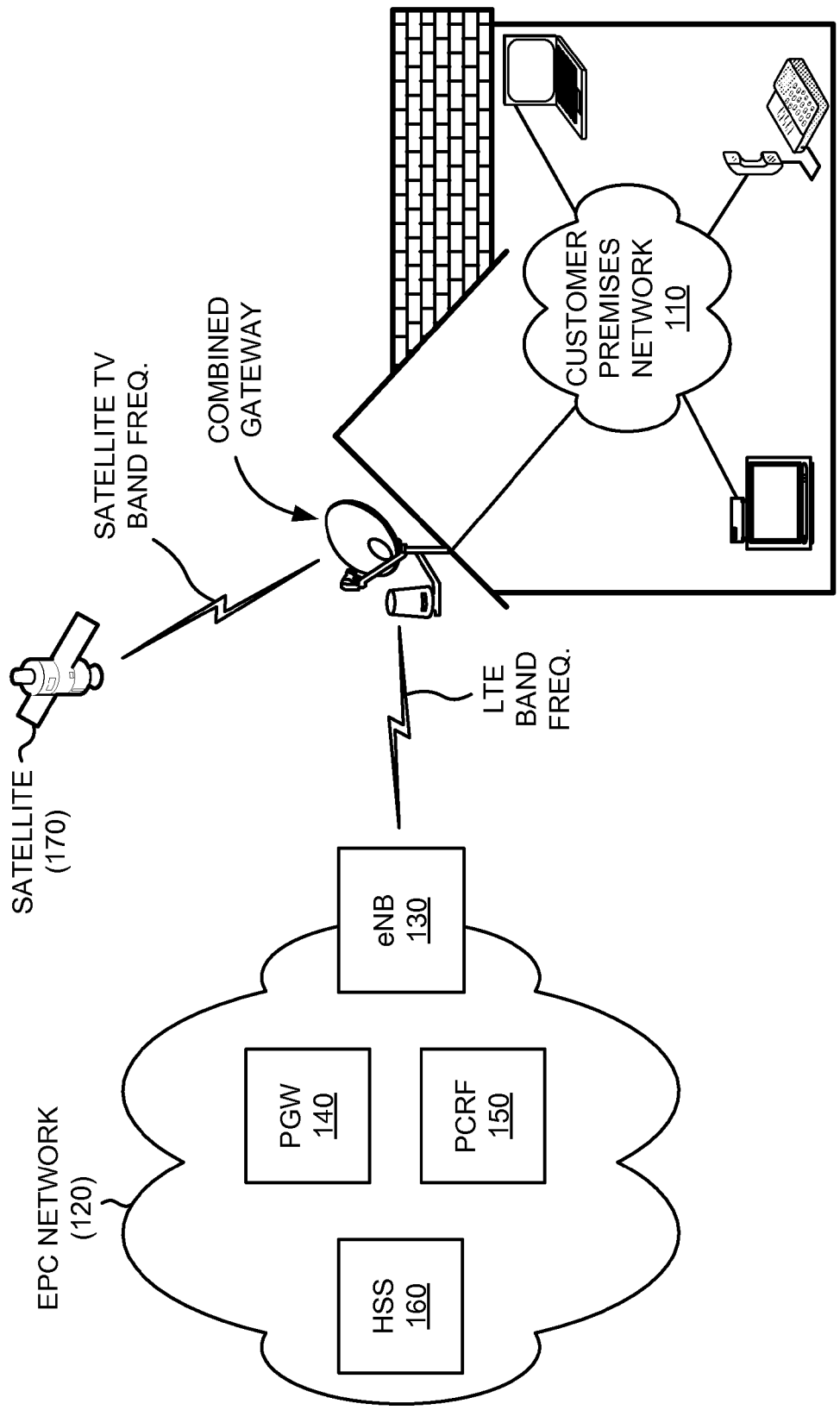
FIG. 1 is a diagram of an example network in which systems and/or methods described herein may be implemented.

FIG. 1 is a diagram of an example network 100 in which systems and/or methods described herein may be implemented. As illustrated, network 100 may include a customer premises network 110, an evolved packet core (EPC) network 120, and a satellite 170. EPC network 120 may include an eNodeB (eNB) 130, a packet data network (PDN) gateway server (PGW) 140, a policy and charging rules function (PCRF) 150, and a home subscriber server (HSS) 160. A single customer premises network 110, EPC network 120, eNodeB 130, PGW server 140, policy server 150, HSS 160, and satellite 170 have been illustrated in FIG. 1 for simplicity. In practice, there may be more customer premises networks 110, EPC networks 120, eNodeBs 130, PGW servers 140, policy servers 150, HSSs 160, and/or satellites 170.

Customer premises network 110 may include one or more devices connected to each other, eNB 130, and/or satellite 170. Devices in customer premise network 110 may include, for example, set-top boxes (STBs), televisions, computers, voice-over-Internet-protocol (VoIP) devices, and home networking equipment (e.g., routers, cables, splitters, local gateways, etc.). Devices within customer premises network 110 may be connected via wired (e.g., coaxial cable, Telecommunications Industry Association (TIA) Category 5 ("Cat 5") cable, TIA Cat 3 cable, etc.) or wireless connections (e.g., using network devices such as those available under the IEEE 802.11 wireless LAN standards). In the example shown in FIG. 1, customer premises network 110 may connect to eNB 130 through a two-way wireless connection (e.g., using an LTE band frequency) and connected to satellite 170 through a one-way (e.g., downlink) wireless connection (e.g., using a satellite TV band frequency). Customer premises network 110 may combine LTE functionality with satellite TV service. Using a combined gateway that includes an outdoor LTE modem, both broadband (over LTE) service (e.g., via eNodeB 130) and satellite TV service (e.g., via satellite 170) may be brought into customer premises network 110 over a single coaxial line.

EPC network 120 may include a core network architecture of the 3GPP LTE wireless communication standard. In one example, EPC network 120 may include an all-IP packet-switched core network that supports high-speed wireless and wireline broadband access technologies. In another example, EPC network 120 may provide packet-switched voice services (e.g., which are traditionally circuit-switched) using an Internet Protocol Multimedia Subsystem Multimedia Subsystem (IMS) network (not shown).

eNodeB 130 may include an LTE base station that may cover a particular geographic area serviced by EPC network 120. eNodeB 130 may include one or more devices that receive information, such as voice, video, text, and/or other data, from other network devices and/or that transmit the information to customer premises network 110 via an air interface. eNodeB 130 may also include one or more devices that receive information from devices in customer premises network 110 via an air interface and/or that transmit the information to other network devices.

PGW 140 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, PGW 140 may provide connectivity of customer premises network 110 to external packet data networks (PDNs, not shown) by being a traffic exit/entry point for customer premises network 110. Customer premises network 110 may simultaneously connect to more than one PGW for accessing multiple PDNs. PGW 140 may perform policy enforcement, packet filtering for each user, charging support, lawful intercept, and packet screening.

PCRF 150 may include one or more computation or communication devices that may provide policy control decision and flow based charging control functionalities. PCRF 150 may provide network control regarding service data flow detection, gating, quality of service (QoS) and flow based charging, etc. PCRF 150 may determine how a certain service data flow shall be treated, and may ensure that user plane traffic mapping and treatment is in accordance with a current user's subscription profile. For example, in one implementation, PCRF 150 may use a normal (default) profile and an emergency profile to differentiate types of services to provide to a subscribing station based on the subscribing station's local conditions.

HSS 160 may include one or more computation or communication devices that gather, process, search, and/or provide information in a manner described herein. HSS 160 may contain subscription-related information (e.g., subscriber profiles), may perform authentication and authorization of a user (e.g., a user of customer premises network 110), and may provide information about a subscribing station's location and IP information. In an implementation herein, HSS 160 may store a normal (or default) profile for a subscribing station associated with customer premises network 110. HSS 160 may also store an emergency profile that may restrict non-critical downlink traffic (e.g., data from EPC network sent over the LTE frequency band) when, for example, extreme conditions occur at the customer premises gateway.

As described below, critical traffic may include, for example, conversational voice and/or conversational video data as identified, for example, by QoS classification of data packets. In one implementation, critical traffic may be based on LTE Quality Class Indicators (QCIs). Generally, a QCI is a scalar value which refers to a set of parameters that determine packet forwarding characteristics. QCIs are defined for different kinds of service flows. For example, QCI1 corresponds to conversational voice, while QCI2 corresponds to conversational video (e.g., live streaming). Other QCIs, which may be considered indicators of non-critical traffic, may correspond to buffered video, real-time gaming, IMS signaling, etc. While example emergency profiles that restrict service flows to all but QCI1 and QCI2 traffic are primarily described herein, different emergency profiles with other combinations of QCI designators or other traffic designations may be used. For example, one emergency profile may include QCI1 traffic only, while another emergency profile may include QCI1/QCI2 and some best effort traffic (e.g., low bandwidth Internet access).

Satellite 170 may provide multimedia content from, for example, a direct broadcast satellite (DBS) service provider (not shown). Satellite 150 may provide a downlink signal over a designated satellite TV band frequency, typically in the range of 950 MHz to 2150 MHz. The downlink signal may be received using a satellite antenna/receiver system at a customer premises to present satellite TV content to a user.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 shows example components of network 100, in other implementations, network 100 may contain fewer components, different components, differently arranged components, and/or additional components than those depicted in FIG. 1. Alternatively, or additionally, one or more components of network 100 may perform one or more other tasks described as being performed by one or more other components of network 100.

Figure 2:
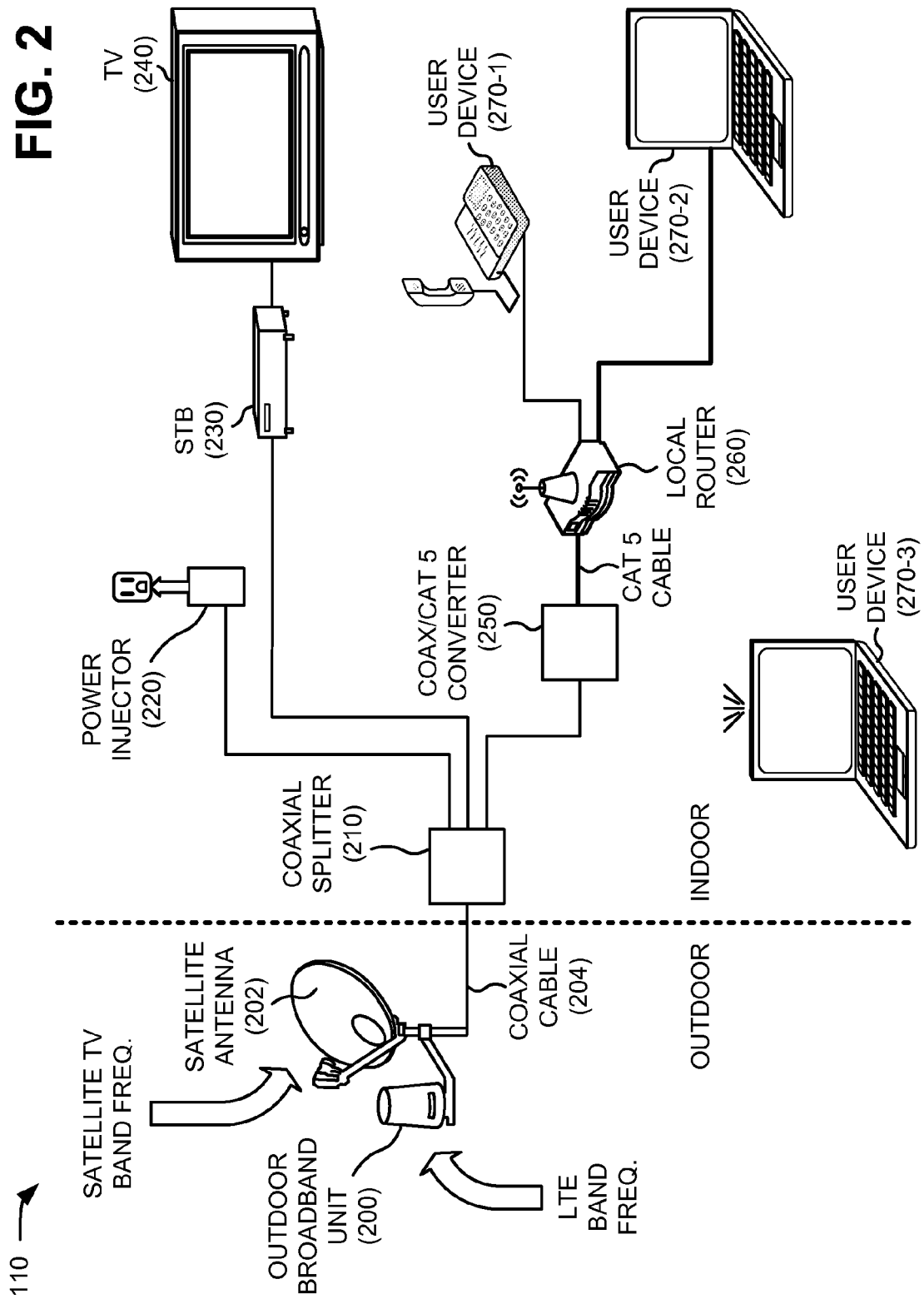
FIG. 2 is a diagram of an example customer premises network illustrated in FIG. 1 according to an implementation described herein.

FIG. 2 is a diagram of an example customer premises network 110 according to an implementation described herein. As illustrated, customer premises network 110 may include an outdoor broadband unit 200, a satellite antenna 202, a coaxial splitter 210, a power injector 220, a set-top box (STB) 230, a television 240, a coax/Cat 5 converter 250, a local router 260, and user devices 270-1, 270-2, and 270-3 (referred to herein collectively as "user devices 270" or generically as "user device 270"). A single outdoor broadband unit 200, coaxial splitter 210, power injector 220, STB 230, television 240, coax/Cat 5 converter 250, and local router 260, and three user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, local routers 260, and/or user devices 270.

Outdoor broadband unit 200 may include one or more data processing and/or data transfer devices, such as a gateway, a router, a modem, a switch, a firewall, a NIC, a hub, a bridge, a proxy server, an OADM, or some other type of device that processes and/or transfers data. In one example, outdoor broadband unit 200 may include a wireless gateway that provides a convergence point between wireless protocols (e.g., associated with eNodeB 130) and IP protocols (e.g., associated with user devices 270). Outdoor broadband unit 200 may be physically deployed with satellite antenna 202 (e.g., on a roof or a side wall of a house associated with customer premises network 110). For example, outdoor broadband unit 200 may utilize a pre-existing or new satellite TV installation in a way that both broadband (over LTE) service and satellite TV are brought indoors (e.g., inside the customer premises) over a single coaxial cable 204. Components of outdoor broadband unit 200 may also be powered using coaxial cable 204. Outdoor broadband unit 200 is described further in connection with, for example, FIG. 3.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitter 210 may include conventional splitting technologies to filter LTE and satellite TV signals. In one implementation, coaxial splitter 210 may include a SWiM splitter. For example, coaxial splitter 210 may facilitate allocating logical channels using different frequency blocks for viewer-selected television programming and broadband signals to SWiM-compatible STB 230 and/or local router 260.

Power injector 220 may include a conventional mechanism for injecting DC power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240.

Coax-to-Cat 5 adapter 250 may include a conventional device to convert incoming signals from coaxial cables to outgoing signals on Cat 5 cables.

Local router 260 may include a device that may provide connectivity between equipment within customer premises network 110 (e.g., user devices 270) and between the customer premises network 110 and an external network (e.g., EPC network 120). In one implementation, local router 260 may include a wireless access point that employs one or more short-range wireless communication protocols for a wireless personal area network (WPAN) and/or a wireless local area network (WLAN), such as, for example, IEEE 802.11 (e.g., Wi-Fi) and IEEE 802.15 (e.g., Bluetooth). In other implementations, different short-range wireless protocols and/or frequencies may be used. Local router 260 may also include one or more wired (e.g., Ethernet, TIA Cat 3 cables) connections.

User device 270 may include any device that is capable of communicating with customer premises network 110 via local router 260. For example, user device 270 may include a mobile computation and/or communication device, such as a laptop computer, a VoIP-enabled device, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a VoIP-enabled device phone base, a personal computer, a gaming system, etc.

In implementations described herein, customer premises equipment for wireless broadband service can be integrated with the satellite TV MoCA and SWiM environment to provide both TV services and broadband wireless service. With this architecture, the combination of outdoor broadband unit 200 and satellite antenna 202 may follow a channelization plan dubbed "Mid-RF" (425-650 MHz), requiring a single coax line (e.g., coaxial cable 204) in the deployment. Coaxial cable 204 may feed the in-home coaxial installation to deliver the satellite TV services to the corresponding STBs 230/televisions 240 and LTE services to local router 260/user devices 270.

Although FIG. 2 shows example components of customer premises network 110, in other implementations, customer premises network 110 may contain fewer components, different components, differently arranged components, and/or additional components than those depicted in FIG. 2. Alternatively, or additionally, one or more components of customer premises network 110 may perform one or more other tasks described as being performed by one or more other components of customer premises network 110.

Figure 3:
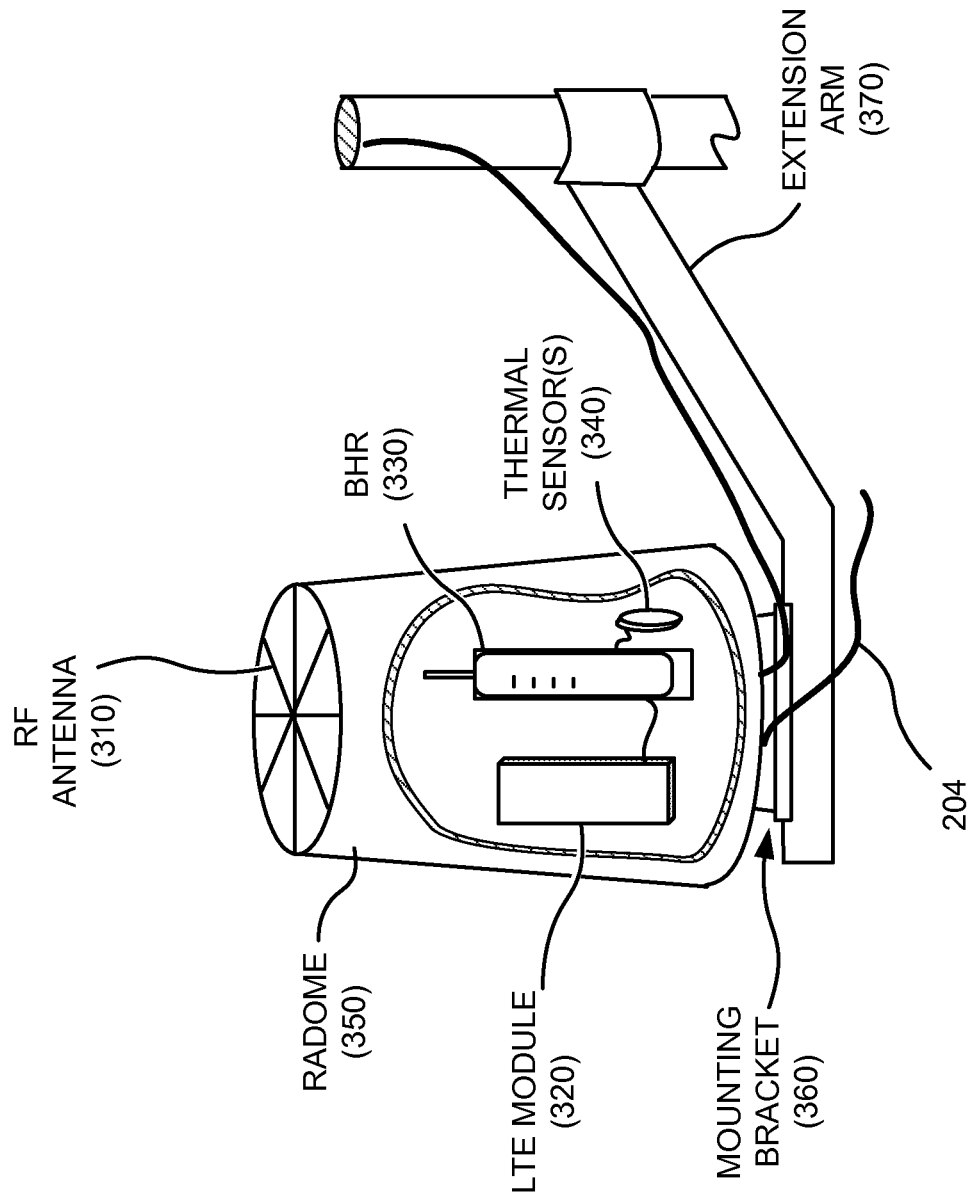
FIG. 3 is a diagram of example components of an outdoor broadband unit of the customer premises network depicted in FIG. 2.

FIG. 3 is a diagram of example components of an outdoor broadband unit 200. As illustrated, outdoor broadband unit 200 may include a radio frequency (RF) antenna 310, an LTE module 320, a broadband home router (BHR) 330, one or more thermal sensor 340, a radome 350, a mounting bracket 360, and an extension arm 370.

RF antenna 310 may include an antenna to transmit and/or receive RF signals over the air. RF antenna 310 may, for example, receive RF signals from LTE module 320/BHR 330 and transmit the RF signals over the air. Also, RF antenna 310 may, for example, receive RF signals over the air and provide them to LTE module 320/BHR 330. In one implementation, for example, LTE module 320/BHR 330 may communicate with a base station (e.g., eNodeB 130) connected to a network (e.g., EPC network 120) to send and/or receive signals from user devices 270. In implementations herein, RF antenna 310 may be enclosed by radome 350, integrated with radome 350, or external to radome 350. While one RF antenna 310 is shown in FIG. 3, outdoor broadband unit 200 may include more than one antenna in other implementations.

LTE module 320 may include hardware or a combination of hardware and software having communication capability via an air interface. For example, LTE module 320 may receive broadband signals and/or VoIP signals from eNodeB 130 (e.g., via RF antenna 310) and transmit broadband signals and/or VoIP signals to eNodeB 130 (e.g., via RF antenna 310).

BHR 330 may include a device for buffering and forwarding data packets toward destinations. For example, BHR 330 may receive data packets from eNodeB 130 (e.g., via LTE module 320) and forward the data packets toward user devices 270. In addition, BHR 330 may receive data packets from user devices 270 (e.g., via local router 260) and forward the data packets toward recipient devices (e.g., a service provider) via EPC network 120. BHR 330 may include a bridge device to receive signals from LTE module 320 via a wired USB connection and convert the signals to an Ethernet over coax signal. The Ethernet over coax signal may be assigned a logical channel (e.g., according to SWiM guidelines) and may be combined with coaxial input from satellite antenna 202. In one implementation, the output from BHR 330 may be inserted in a MoCA channel that is separate from the 950 MHz to 2150 MHz range of a typical satellite TV system. As described further herein, BHR 330 may include functional components to receive inputs from thermal sensor 340 and initiate changes to adapt to extreme conditions while providing essential broadband (e.g., telephony) services.

Thermal sensor 340 may include a sensing device to detect a temperature within radome 350 and/or within one or more components of outdoor broadband unit 200. Thermal sensor may generate a temperature signal that is received by BHR 330. Thermal sensor 340 may be a single sensor or an array of sensors. Physical properties and/or arrangement of the sensor may be selected to produce temperature signals on the order of minutes or seconds, such as five seconds, ten seconds, thirty seconds, one minute, etc. Temperature sensing capabilities of thermal sensor 340 may be based on, for example, the mass, surface area, shape, material composition, etc., of the thermal sensor 340. In one implementation, thermal sensor 340 may effectively operate to detect temperatures between −30 deg. C. (−22 deg. F.) and 95 deg. C. (203 deg. F.).

Radome 350 (shown with cut-away view to reveal LTE module 320, BHR 330, thermal sensor 340) may provide a weatherproof enclosure to protect RF antenna 310, LTE module 320, BHR 330, thermal sensor 340 and/or other components of outdoor broadband unit 200. Generally, radome 340 may include any RF transparent structure that protects components in an outdoor environment.

Mounting bracket 360 may include a mechanism to secure radome 350 and the enclosed components (e.g., RF antenna 310, LTE module 320, BHR 330, thermal sensor 340 and/or other components) of outdoor broadband unit 200 to extension arm 370. In one implementation, mounting bracket 360 may include hardware that includes high thermal conductivity, such as, copper, aluminum, or alloys thereof. In an implementation, mounting bracket 360 may include a material having a thermal conductivity value of at least 120 Watts per degrees Kelvin per meter (W/(m*K)). Mounting bracket 360 may, for example, transfer heat from within radome 350 to extension arm 370. Mounting bracket 360 may include one or more mounting holes for accepting fasteners, such as machine screws, for use in attaching outdoor broadband unit 200 to mounting bracket 360 and/or extension arm 370.

Extension arm 370 may provide a support structure to support outdoor broadband unit 200 (e.g., via mounting bracket 360). In one implementation, extension arm 370 may be connected to a pole supporting satellite antenna 202. In other implementations, extension arm 370 may be connected to another structure. Extension arm 370 may include materials and an exposed surface area to act as a heat sink (e.g., for mounting bracket 360). In one implementation, mounting bracket 360 may include a material with high thermal conductivity, such as, copper or aluminum (or alloys thereof), where the material has a thermal conductivity value of at least 120 W/(m*K).

Although FIG. 3 shows example components of outdoor broadband unit 200, in other implementations, outdoor broadband unit 200 may contain fewer components, different components, differently arranged components, and/or additional components than depicted in FIG. 3. Alternatively, or additionally, one or more components of outdoor broadband unit 200 may perform one or more other tasks described as being performed by one or more other components of outdoor broadband unit 200.

Figure 4:
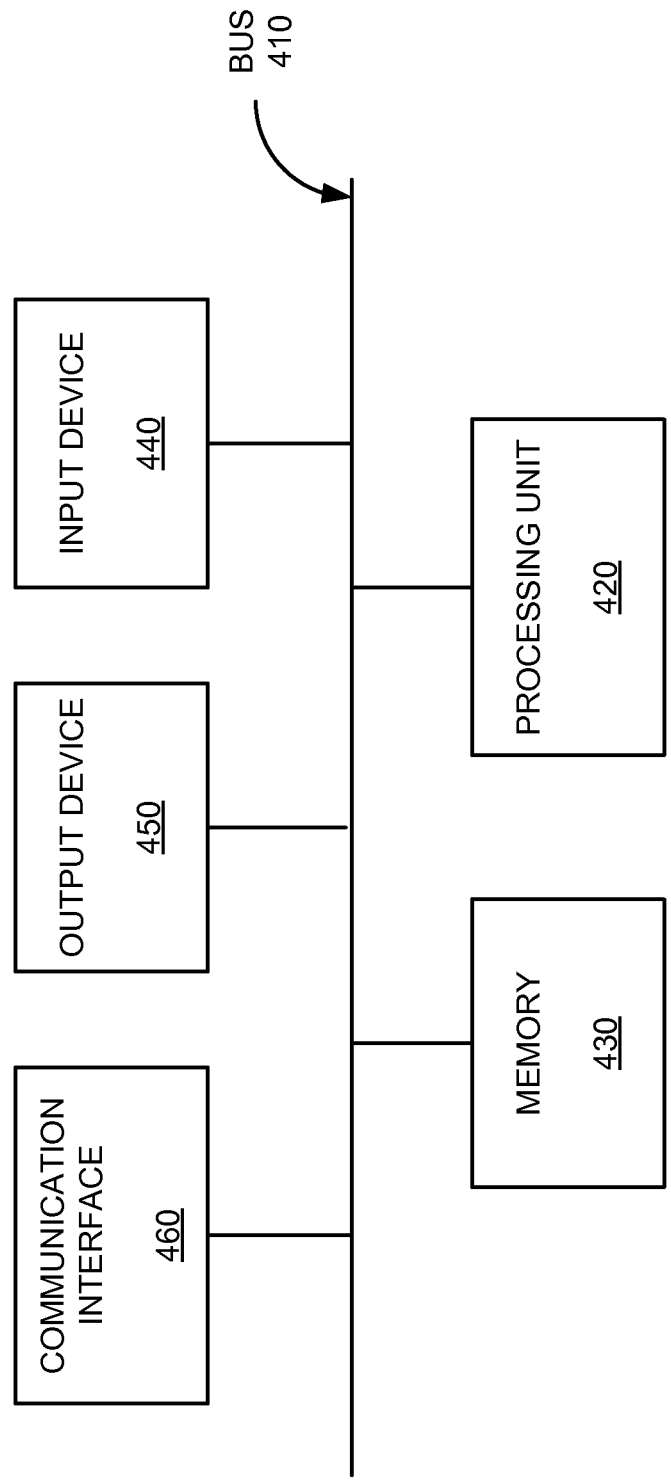
FIG. 4 is a diagram of example components of one of the devices depicted in FIGS. 1-3.

FIG. 4 is a diagram of example components of a device 400 that may correspond to one of the devices of network 100 and/or customer premises network 110. As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other devices of network 100 and/or customer premises network 110.

As described herein, device 400 may perform certain operations in response to processing unit 420 executing software instructions contained in a computer-readable medium, such as memory 430. A computer-readable medium may be defined as a physical or logical memory device. A logical memory device may include memory space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

Figure 5:
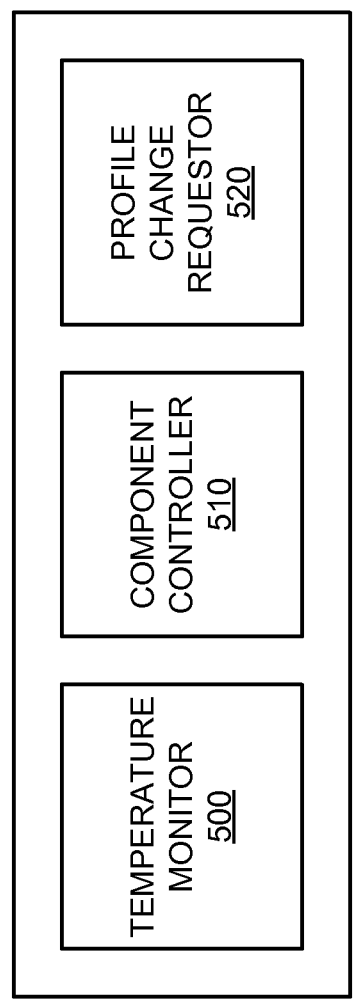
FIG. 5 is a diagram of example functional components of a broadband home router (BHR) of the outdoor broadband unit of FIG. 3.

FIG. 5 is a diagram of example functional components of BHR 330. In one example, the functional components described in connection with FIG. 5 may be implemented by one or more of the components depicted in FIG. 4. As shown, BHR 330 may include a temperature monitor 500, a component controller 510, and a profile change requestor 520.

Temperature monitor 500 may include hardware or a combination of hardware and software that may monitor the temperature of outdoor broadband unit 200 generally and/or one or more of LTE module 320 and BHR 330 particularly. In one implementation, temperature monitor 500 may store (e.g., in memory 430) a threshold value (e.g., approximately 55 degrees Celsius (131 degrees Fahrenheit)) that may be a trigger to enact adaptive measures. For example, temperature monitor 500 may receive an input signal from thermal sensor 340 and compare the input signal to the stored threshold value. Temperature monitor 500 may send an alert signal to, for example, component controller 510 and/or profile change requestor 520, when the input signal reaches/exceeds the stored threshold value. Conversely, temperature monitor 500 may send a normal signal to, for example, component controller 510 and/or profile change requestor 520, when the input signal falls below the stored threshold value (e.g., when normal temperatures resume).

In one implementation, multiple high or multiple low input signals may be used before temperature monitor 500 sends the alert or ok signal. For example, temperature monitor 500 may identify a consecutive sequence (e.g., three or more) of high temperature signals from thermal sensor 340 or determine an average of a particular number of temperature signals from thermal sensor 340. In another implementation, temperature monitor 500 may also monitor that input signals from thermal sensor 340 are available and provide an alert signal if no input signals are present (e.g., if no temperature readings are received within a particular interval).

Component controller 510 may include hardware or a combination of hardware and software that may initiate local actions to control over-heating of components of outdoor broadband unit 200 based on signals from temperature monitor 500. In an implementation, component controller 510 may reduce/resume processing requirements or shut down/restore non-essential components of customer premises network 110. For example, component controller 510 may adjust local settings (e.g., in accordance with a local emergency profile) to block non-essential traffic from being sent over LTE module 320. For example, in response to a high temperature alert from temperature monitor 500, component controller 510 may block outgoing (e.g., uplink) LTE traffic that is not classified as QCI1 (conversational voice) or QCI2 (conversational video).

Profile change requestor 520 may include hardware or a combination of hardware and software that may initiate remote actions to control over-heating of components of outdoor broadband unit 200 based on signals from temperature monitor 500. In an implementation, profile change requestor 520 may request that EPC network 120 invoke a profile change (e.g., normal profile/emergency profile) associated with LTE module 320 to limit/resume non-essential LTE traffic. For example, in response to a high temperature alert from temperature monitor 500, profile change requestor 520 may send, via LTE module 320, a signal requesting that an emergency profile for LTE module 320 be activated. The emergency profile may cause PCRF 150 to instruct PGW 140 to drop all LTE traffic (or all downlink traffic) that is not classified as QCI1 (conversational voice) or QCI2 (conversational video).

Although FIG. 5 shows example functional components of BHR 330, in other implementations, BHR 330 may contain fewer functional components, different functional components, differently arranged functional components, or additional functional components than depicted in FIG. 5. Alternatively, or additionally, one or more functional components of BHR 330 may perform one or more other tasks described as being performed by one or more other functional components of BHR 330.

Figure 6:
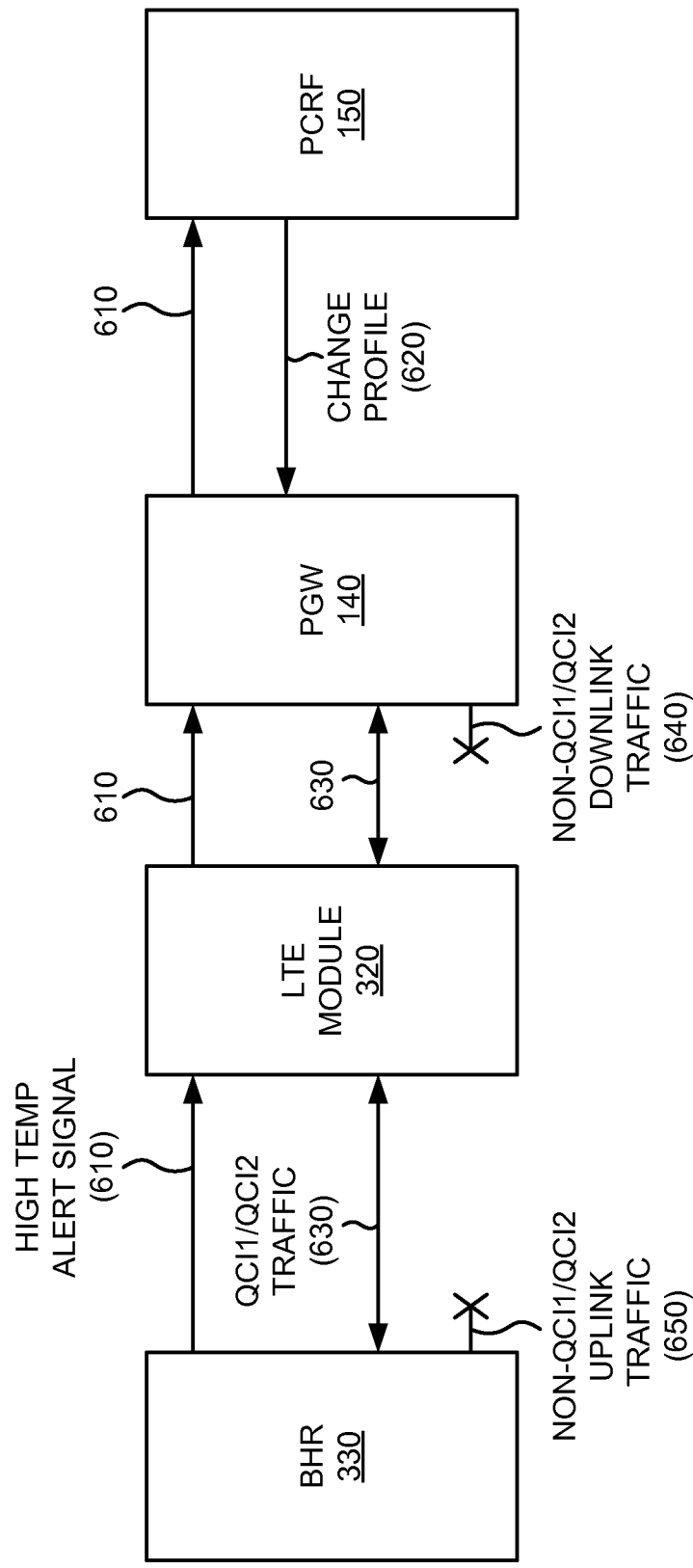
FIG. 6 is a diagram of example interactions between components of an example portion of the network of FIG. 1.

FIG. 6 is a diagram of example interactions between components of an example portion 600 of network 100. As shown, example network portion 600 may include PGW 140, PCRF 150, LTE module 320, and BHR 330. PGW 140, PCRF 150, LTE module 320, and BHR 330 may include the features described above in connection with one or more of FIGS. 1-5.

BHR 330 may receive a high temperature indication (e.g., from thermal sensor 340) and invoke local changes to reduce processing demands on LTE module 320. As shown in FIG. 6, BHR 330 may also provide a high temperature alert signal 610 to PCRF 150 (via LTE module 320 and PGW 140) to initiate actions within EPC network 110. As described above, high temperature alert signal 610 may indicate that local temperatures of outdoor broadband unit 200 (or particular components thereof) have exceeded safe conditions. In response to high temperature alert signal 610, PCRF 150 may invoke an emergency profile for LTE 320. Thus, PCRF 150 may provide change profile instructions 620 to PGW 140. In one implementation, change profile instructions 620 may include, for example, instructions to block particular traffic to LTE module 320 (e.g., any downlink traffic that is not classified as QCI1 (conversational voice) or QCI2 (conversational video). In other implementations, change profile instructions 620 may include different instructions or different classifications for blocked/acceptable LTE traffic.

In response to change profile instructions 620, PGW 140 may filter subsequent downlink traffic directed toward LTE module 320/BHR 330. BHR 330 may invoke similar restrictions for uplink traffic. Thus, critical LTE traffic, such as QCI1 and/or QCI2 uplink and downlink traffic may pass through LTE module 320, as indicated by reference numbers 630. However, based on change profile instructions 620, PGW 140 may drop non-critical downlink traffic, such as non-QCI1/QCI2 downlink traffic 640. Similarly, BHR 330 may drop non-critical uplink traffic, such as non-QCI1/QCI2 uplink traffic 650. Thus, non-critical LTE traffic may be blocked from LTE module 320 when local high temperatures are indicated.

When local temperatures (e.g., as indicated by thermal sensor 340) return to non-critical levels, BHR 330 (e.g., component controller 510) may adjust local settings (e.g., in accordance with a local normal/default profile) to permit normal (e.g., both essential and non-essential traffic) over LTE module 320. For example, in response to a normal-temperature signal from temperature monitor 500, component controller 510 may allow all classes of outgoing (e.g., uplink) LTE traffic. BHR 330 may provide a normal-temperature signal (not shown) via LTE module 320 and PGW 140 to PCRF 150 to request a return to the normal profile for LTE module 320. The normal-temperature signal may cause PCRF 150 to communicate to PGW 140 to resume normal broadband/LTE traffic flow for LTE module 320.

Although FIG. 6 shows example components of network portion 600, in other implementations, network portion 600 may contain fewer components, different components, differently arranged components, or additional components than depicted in FIG. 6. Additionally, or alternatively, one or more components of network portion 600 may perform one or more other tasks described as being performed by one or more other components of network portion 600.

Figure 7:
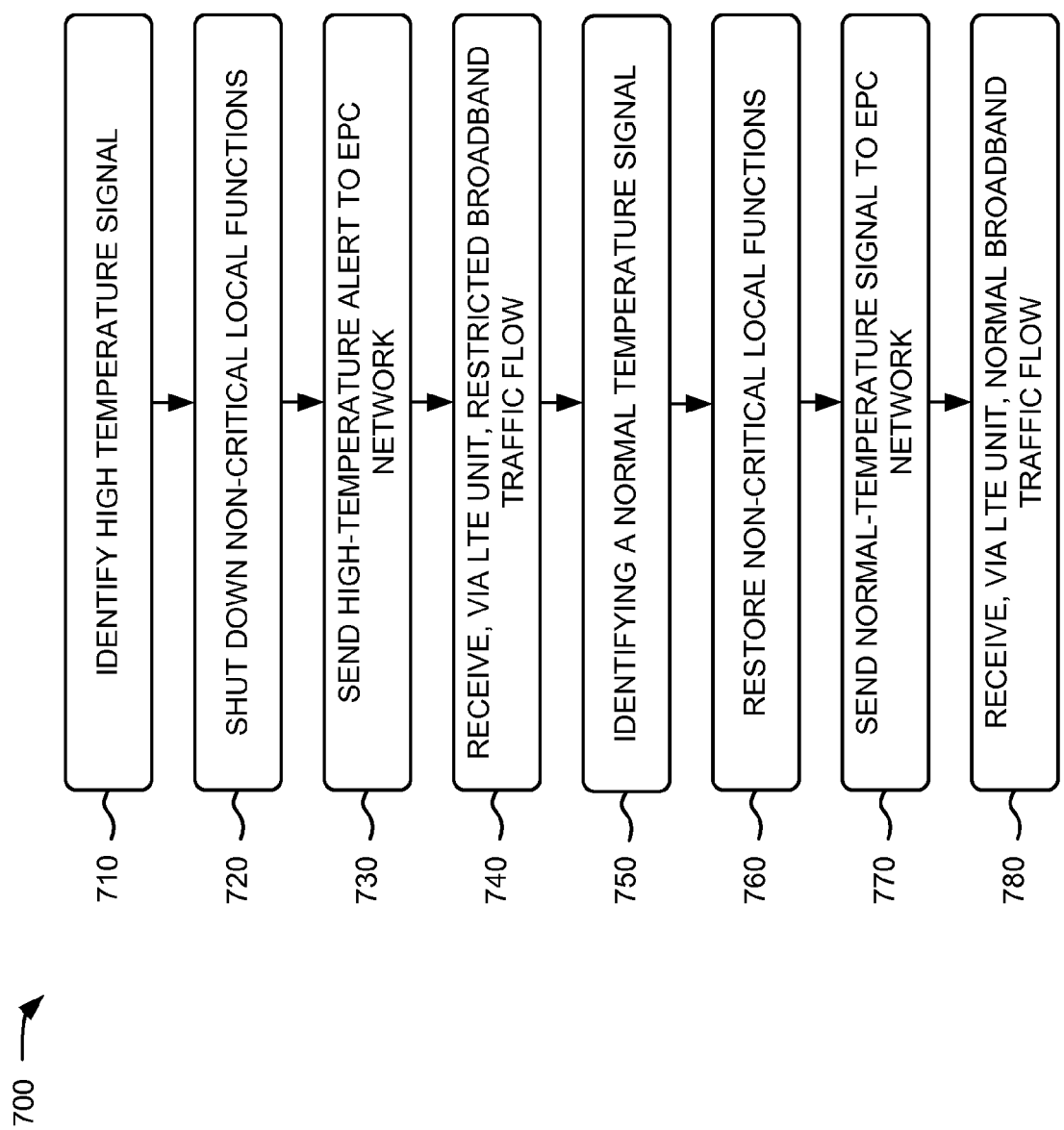
FIG. 7 is a flow chart of an example process for adapting broadband services to provide emergency telephony service in extreme conditions according to implementations described herein.

FIG. 7 is a flow chart of an example process 700 for adapting broadband services to provide emergency telephony service in extreme conditions according to implementations described herein. In one implementation, process 700 may be performed by BHR 330. In another implementation, some or all of process 700 may be performed by another device or group of devices, including or excluding BHR 330.

As illustrated in FIG. 7, process 700 may include receiving a high temperature signal (block 710) and shutting down non-critical local functions (block 720). For example, in implementations described above in connection with FIG. 5, BHR 330 (e.g., temperature monitor 500) may receive an input signal from thermal sensor 340 and compare the input signal to a stored threshold value. Temperature monitor 500 may send an alert signal to, for example, component controller 510 and/or profile change requestor 520, when the input signal reaches/exceeds the stored threshold value. BHR 330 (e.g., component controller 510) may adjust local settings (e.g., in accordance with a local emergency profile) to block non-essential traffic from being sent over LTE module 320.

For example, in response to a high temperature alert from temperature monitor 500, component controller 510 may block outgoing (e.g., uplink) LTE traffic that is not classified as QCI1 or QCI2.

Returning to FIG. 7, process 700 may include sending a high-temperature alert to an EPC network (block 730), and receiving a restricted broadband traffic flow (block 740). For example, in implementations described above in connection with FIG. 5, BHR 330 (e.g., profile change requestor 520), in response to a high temperature alert from temperature monitor 500, may send, via LTE module 320, a signal requesting an emergency profile for LTE module 320 to be activated. The emergency profile may cause PCRF 150 to instruct PGW 140 to drop all LTE traffic that is not classified as QCI1 (conversational voice) or QCI2 (conversational video).

Returning to FIG. 7, process 700 may include identifying a normal temperature signal (block 750), restoring non-critical local functions (block 760), sending a normal-temperature signal to EPC network (block 770), and receiving a normal broadband traffic flow (block 780). For example, in implementations described above in connection with FIG. 6, when local temperatures (e.g., as indicated by thermal sensor 340) return to non-critical levels, BHR 330 (e.g., component controller 510) may adjust local settings (e.g., in accordance with a local normal profile) to permit normal (e.g., both essential and non-essential traffic) over LTE module 320. For example, in response to a normal-temperature signal from temperature monitor 500, component controller 510 may allow all classes of outgoing (e.g., uplink) LTE traffic. BHR 330 may provide a normal-temperature signal via LTE module 320 and PGW 140 to PCRF 150 to request a return to the normal profile for LTE module 320. The normal-temperature signal may cause PCRF 150 to communicate to PGW 140 to resume normal broadband/LTE traffic flow for LTE module 320.

Systems and/or methods described herein may provide customer premises equipment (CPE) for a fixed broadband wireless architecture that may adapt to support emergency telephony service in extreme conditions. The systems and/or methods may identify a high-temperature reading from a sensor associated with an outdoor broadband unit and restrict non-critical local functions for the outdoor broadband unit. The systems and/or methods may also send, via the outdoor broadband unit, an alert signal indicating a high-temperature at the outdoor broadband unit, where the alert signal invokes, at a core network, an emergency profile associated with the outdoor broadband unit.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    identifying, by a router for an outdoor broadband unit, a high-temperature reading from a sensor associated with the outdoor broadband unit;
    restricting, by the router and based on identifying the high temperature reading, non-critical traffic from a customer premises network to a Long Term Evolution (LTE) modem in the outdoor broadband unit;
    sending, by the router and via the LTE modem, an alert signal indicating a high-temperature at the outdoor broadband unit, wherein the alert signal invokes, at an evolved packet core network, an emergency profile to drop, at the evolved packet core network, non-critical downlink traffic directed to the outdoor broadband unit; and
    receiving, by the router and via the LTE modem, only critical broadband signals from the evolved packet core network based on the emergency profile.

2. The method of claim 1, where the non-critical traffic includes any broadband traffic that is not classified as conversational voice or conversational video.

3. The method of claim 1, wherein the long term evolution (LTE) module
    receives the critical broadband signals from a base station, and
    forwards the critical broadband signals to the router via a wired connection.

4. The method of claim 1, further comprising:
    combining the critical broadband signals with satellite television signals in a single Multimedia Over Coax Alliance (MoCA)-compliant channel outside a customer premises.

5. The method of claim 1, further comprising:
    identifying, by the router, a normal-temperature reading from the sensor associated with the outdoor broadband unit;
    restoring, by the router, the non-critical traffic from the customer premises network to the Long Term Evolution (LTE) modem in response to the normal-temperature reading; and
    sending, by the router and via the LTE modem, a normal signal indicating a normal temperature at the outdoor broadband unit, wherein the normal signal invokes, at the evolved packet core network, a default profile to forward downlink traffic from the evolved packet core network to the LTE modem.

6. The method of claim 1, where identifying the high-temperature reading from a sensor associated with an outdoor broadband unit includes one or more of:
    comparing an individual temperature signal, received from the sensor, to a stored threshold,
    identifying a particular consecutive sequence of individual temperature signals, received from the sensor, as being above the stored threshold, or comparing an average of a particular number of temperature signals, received from the sensor, to the stored threshold.

7. The method of claim 1, where the critical broadband signals include one of:
   a Long Term Evolution (LTE) signal,
   a Global System for Mobile Communications (GSM) signal,
   a wideband code division multiple access (WCDMA) signal,
   a Ultra Mobile Broadband (UMB) signal,
   a Universal Mobile Telecommunications System (UMTS) signal,
   a Code Division Multiple Access 2000 (CDMA2000) signal,
   a High-Speed Packet Access (HSPA) signal, or
   a Worldwide Interoperability for Microwave Access (WiMax) signal.

8. The method of claim 1, where the emergency profile causes the evolved packet core network to block delivery of downlink broadband traffic that is not classified as conversational voice or conversational video and causes the router to block delivery of uplink broadband traffic that is not classified as conversational voice or conversational video.

9. A device, comprising:
   a memory to store a plurality of instructions; and
   a processor to execute instructions in the memory to:
      monitor temperature readings from a sensor associated with an outdoor broadband unit;
      restrict, when the temperature readings increase above a stored threshold value, non-critical uplink traffic from a customer premises network to a Long Term Evolution (LTE) modem in the outdoor broadband unit;
      send, to a device at an evolved packet core network and when the temperature readings increase above a stored threshold value, an alert signal, wherein the alert signal invokes, at the evolved packet core network, an emergency profile to drop, at the evolved packet core network, non-critical downlink traffic directed to the outdoor broadband unit;
      receive, via the LTE modem, only critical broadband signals from the evolved packet core network based on the emergency profile; and
      send, to the device at the evolved packet core network and when the temperature readings decrease below the stored threshold value, a normal signal, wherein the normal signal invokes, at the evolved packet core network, a default profile associated with downlink traffic directed to the outdoor broadband unit.

10. The device of claim 9, where the processor is further to:
    restore, when the temperature readings decrease below the stored threshold value, the non-critical uplink traffic from the customer premises network to the LTE modem for the outdoor broadband unit.

11. The device of claim 10, where the non-critical uplink traffic includes broadband traffic that is not classified as conversational voice or conversational video.

12. The device of claim 9, where the device is a broadband home router included within the outdoor broadband unit.

13. The device of claim 12, where the outdoor broadband unit includes a mounting bracket mounted to an extension arm configured to transfer heat from the broadband home router, and where the mounting bracket and the extension arm each include a material with a thermal conductivity rating of at least one-hundred and twenty Watts/meter*degrees Kelvin.

14. The device of claim 9, where the processor is further to:
    receive broadband signals from the LTE modem within the outdoor broadband unit and combine the broadband signals with satellite television signals in a single Multimedia Over Coax Alliance (MoCA)-compliant channel outside a customer premises.

15. A non-transitory computer-readable medium storing instructions executable by a computational device to:
    monitor temperature readings from a sensor associated with an outdoor broadband unit;
    restrict when the temperature readings increase above a stored threshold value, non-critical uplink traffic from a customer premises network to a Long Term Evolution (LTE) modem in the outdoor broadband unit;
    send, to a device at an evolved packet core network and when the temperature readings increase above a stored threshold value, an alert signal, wherein the alert signal invokes, at the evolved packet core network, an emergency profile to drop, at the evolved packet core network, non-critical downlink traffic directed to the outdoor broadband unit;
    receive, via the LTE modem, only critical broadband signals from the evolved packet core network based on the emergency profile; and
    send, to the device at the evolved packet core network and when the temperature readings decrease below the stored threshold value, a normal signal, wherein the normal signal invokes, at the evolved packet core network, a default profile associated with downlink traffic directed to the outdoor broadband unit.

16. The computer-readable medium of claim 15, further comprising instructions to:
    restore, when the temperature readings decrease below the stored threshold value, the non-critical uplink traffic from the customer premises network to the LTE modem for the outdoor broadband unit.

17. The computer-readable medium of claim 15, wherein the device at the evolved packet core network device is a policy and charging rules function (PCRF) device of an evolved packet core (EPC) network.

18. An outdoor broadband unit, comprising:
    a broadband home router configured to:
       identify a high-temperature reading from a sensor associated with the outdoor broadband unit,
       restrict, when the high-temperature reading is identified, non-critical uplink traffic from a customer premises network to a Long Term Evolution (LTE) modem in the outdoor broadband unit;
       send, to a device at an evolved packet core network and when the high-temperature reading is identified, an alert signal, wherein the alert signal invokes, at an evolved packet core network, an emergency profile to cause the evolved packet core network to drop, at the evolved packet core network, non-critical downlink traffic directed to the outdoor broadband unit, and
       receive, via the LTE modem, only critical broadband signals from the evolved packet core network based on the emergency profile; and
    a mounting bracket mounted to an extension arm and configured to transfer heat from the broadband home router.

19. The outdoor broadband unit of claim 18, where the broadband home router is further configured to:
    identify a normal temperature reading from the sensor associated with the outdoor broadband unit;
    restore the non-critical uplink traffic for the outdoor broadband unit in response to the normal temperature reading; and send a normal signal indicating a normal temperature at the outdoor broadband unit, wherein the normal signal invokes, at the evolved packet core network, a default profile associated with the outdoor broadband unit.

* * * * *